(12) United States Patent
Tuncel et al.

(10) Patent No.: US 12,429,611 B2
(45) Date of Patent: Sep. 30, 2025

(54) SYSTEM AND METHOD ENABLING THE BEHAVIOR OF RADIOACTIVE SUBSTANCE WITHIN A STRUCTURE TO BE DETERMINED

(71) Applicant: ECZACIBASI MONROL NUKLEER URUNLER SANAYI VE TICARET ANONIM SIRKETI, Kocaeli (AR)

(72) Inventors: Mehmet Tunc Tuncel, Kocaeli (TR); Tahsin Pehlivan, Kocaeli (TR); Harun Kucukmidil, Kocaeli (TR); Isil Coruh, Kocaeli (TR); Mustafa Cakmak, Kocaeli (TR)

( * ) Notice: Subject to any disclaimer, the term of this patent is extended or adjusted under 35 U.S.C. 154(b) by 193 days.

(21) Appl. No.: 18/556,971

(22) PCT Filed: Mar. 11, 2022

(86) PCT No.: PCT/TR2022/050225
§ 371 (c)(1),
(2) Date: Oct. 24, 2023

(87) PCT Pub. No.: WO2022/231545
PCT Pub. Date: Nov. 3, 2022

(65) Prior Publication Data
US 2024/0201401 A1    Jun. 20, 2024

(30) Foreign Application Priority Data
Apr. 30, 2021   (TR) .......................... TR2021/007431

(51) Int. Cl.
| | |
|---|---|
| *G01T 1/16* | (2006.01) |
| *G01T 7/00* | (2006.01) |
| *B01D 15/08* | (2006.01) |

(52) U.S. Cl.
CPC .................. *G01T 1/16* (2013.01); *G01T 7/00* (2013.01); *B01D 15/08* (2013.01)

(58) Field of Classification Search
CPC .. G01T 1/16; G01T 7/00; G01T 1/169; G01T 1/167; G01T 1/00; B01D 15/08; G01N 2223/32; G01N 2223/33; G01N 2223/626
See application file for complete search history.

(56) References Cited

U.S. PATENT DOCUMENTS

| | | | |
|---|---|---|---|
| 4,929,832 A | 5/1990 | Ledley | |
| 2006/0137479 A1* | 6/2006 | Gilbert | .................. E21B 49/081 |
| | | | 73/152.23 |

FOREIGN PATENT DOCUMENTS

| | | |
|---|---|---|
| CN | 210347947 U | 4/2020 |
| EP | 0112645 A1 | 7/1984 |

OTHER PUBLICATIONS

Iwamoto et al., "Novel methods for estimating 3D distributions of radioactive isotopes in materials", Nuclear Instruments and Methods in Physics Research A, vol. 831, pp. 295-300. (Year: 2016).*

(Continued)

*Primary Examiner* — Kiho Kim
(74) *Attorney, Agent, or Firm* — Egbert, McDaniel & Swartz, PLLC

(57) ABSTRACT

Disclosed is a system and a method enabling the behavior of a radioactive substance within a structure to be determined. More particularly, the disclosed is a system and a method wherein it is possible to determine, along a column, the position and/or distribution and/or movement speed of the substances moving within the column and/or the time when the substances will leave the column and how much of the substance reaching the column outlet will begin to leave the column and with what activity, and consequently, it is possible to provide optimization and automation for proceeding to the next process step.

15 Claims, 8 Drawing Sheets

(56) References Cited

OTHER PUBLICATIONS

International Search Report for corresponding PCT/TR2022/050225 dated Apr. 22, 2022.
Written Opinion of the International Searching Authority for corresponding PCT/TR2022/050225 dated Apr. 22, 2022.

* cited by examiner

SYSTEM AND METHOD ENABLING THE BEHAVIOR OF RADIOACTIVE SUBSTANCE WITHIN A STRUCTURE TO BE DETERMINED

SUBJECT OF THE INVENTION

The invention relates to a system and a method enabling to determine the position and distribution of a radioactive substance within a structure, the movement speed of the radioactive substance within the structure and the time when the radioactive substance will leave the structure.

STATE OF THE ART

For the production of some radioactive solutions, it is preferred to perform the production via a method where no carrier atom is added, i.e. via the non carrier added (NCA) method. The product of Lu-177 radiolabeling solution is also produced via NCA method. The production of the Lu-177 solution was first realized in 1994 by Balasubramanium by way of neutron irradiation of ytterbium. In this method, Yb176 converts into Yb177 by the neutron capture reaction and Lu-177 forms as a result of the beta decay of the formed Yb177 (half life=1.9 hours). Lu-177 having high specific activity forms as a result of this process and the formed product is called "non carrier added" Lu177. The production method is NCA, because only a single carrier (Lu-177) forms in the finished product resulting from the nuclear np reaction. However, since the finished product contains macro amount of ytterbium 176 and micro amount of lutetium 177, which have chemically similar properties, and since it is required that ytterbium 176 be limited in the pharmacopeial of the finished product and more importantly, be non-existent in the finished product from the perspective of drug activity, a chemical separation should be performed (Horwitz, A process for the separation of 177Lu from neutron irradiated 176Yb targets, Applied Radiation and Isotopes, 63 (2005) 23-36). A separation and purification system was designed based on the basic information in the literature. The major challenge of the method is the necessity to separate 176Yb and 177Lu, as these are chemically similar elements.

By means of the extraction chromatography technique, two or more radioactive substances with very similar chemical properties, which are dissolved in an appropriate solvent, are separated. The radioactive substances are charged with an acid of certain molarity to a column. The acid with another molarity is passed through the column to advance the charged substances within the column. The substances, to be subjected to separation, move at a certain speed downward from the top along the column that stands upright. The column creates a phase difference for the radioactive substances passing through the same, according to the property of the resin used within said column, thereby provides the movement of the radioactive substances within said column. Knowing the movement speeds of the substances within the column and the time when they will leave the column affects the efficiency of the solid phase extraction. A fixed radioactivity detector is used in the devices of the state of the art employed for the solid phase extraction chromatography. These detectors are positioned at the inlet or outlet of the column or the cartridge according to the physical characteristic of the device. The radioactive material moving inside the column or the cartridge is waited to reach the column outlet and it is enabled to proceed to the next process step according to the activity value read on the detector. The challenge here is the inability to know the maximum value of the activity of the substance and the extent by which it has distributed through the column until it comes in front of the detector. Knowing these values before the substance reaches the column outlet makes it possible to proceed to the next process step at the optimum point and to manage the process via automation.

With the system and method according to the invention, the problem of being unable to know the position and the extent of distribution of the activity on the column or on the cartridge until the substances come in front of the detector, said problem being caused by the use of a fixed detector, is eliminated and it is made possible to monitor along the column the position and distribution of the substances moving within the column.

OBJECT OF THE INVENTION

An object of the invention is to develop a system and a method wherein it is possible to determine the position and/or distribution and/or movement speed along the column and/or column exit time of the substances moving within the column.

Another object of the invention is to develop a system and a method wherein it is possible to determine how much of the substance reaching the column outlet will begin to leave the column and with what activity.

Another object of the invention is to develop a system and a method wherein the optimization and automation are provided for proceeding to the next process step, owing to the possibility to determine how much of the substance reaching the column outlet will begin to leave the column and with what activity.

Figure 1:
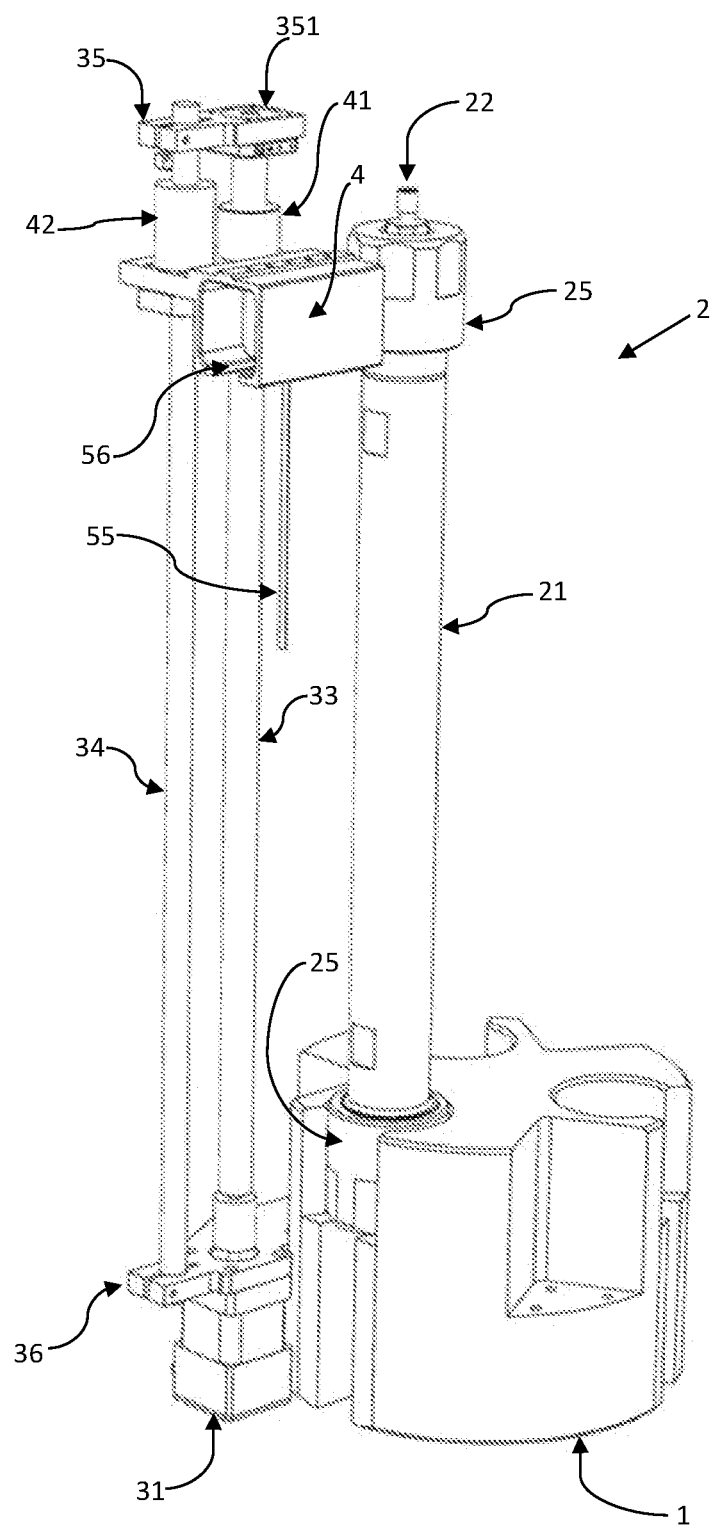
FIG. 1: An isometric view of the system according to the invention
Figure 2:
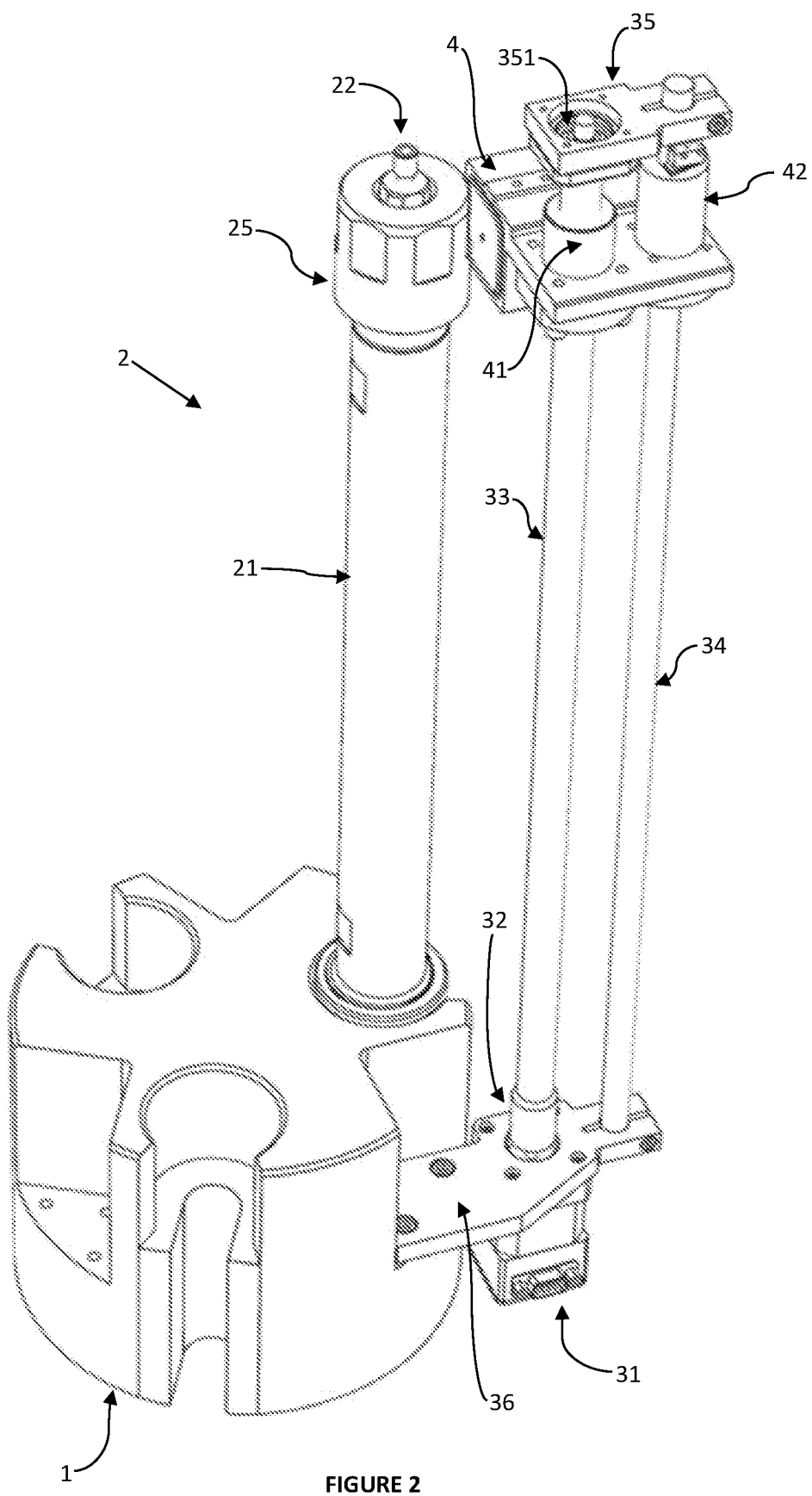
FIG. 2: Another isometric view of the system according to the invention
Figure 3:
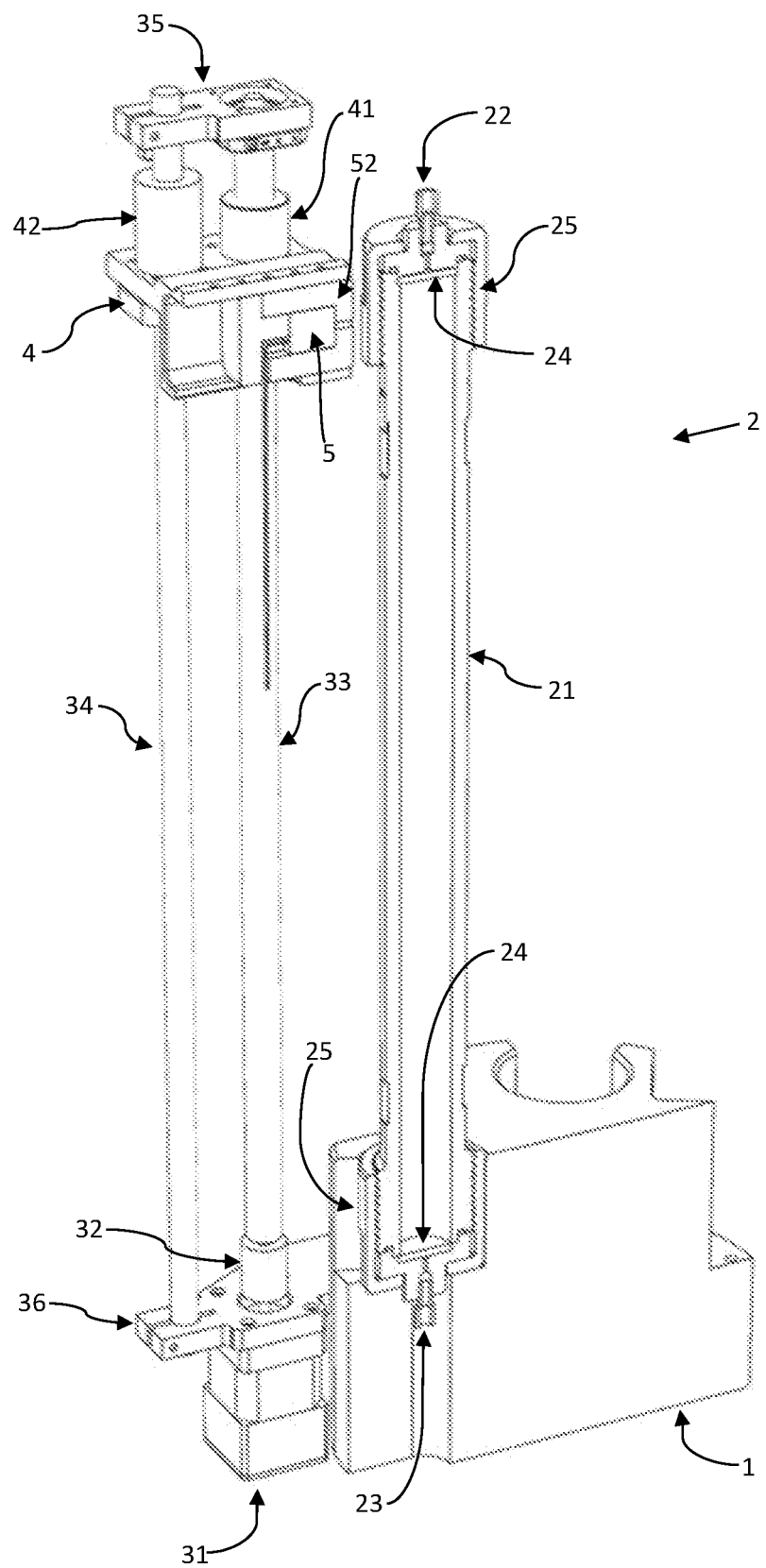
FIG. 3: A sectional view of the system according to the invention
Figure 4:
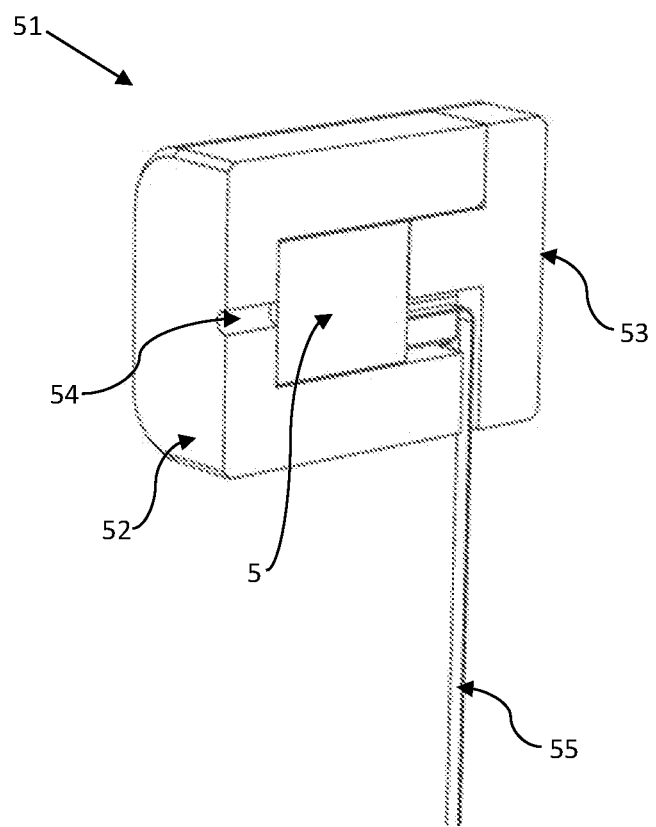
FIG. 4: A sectional view of the radioactivity detector and the detector collimator
Figure 5:
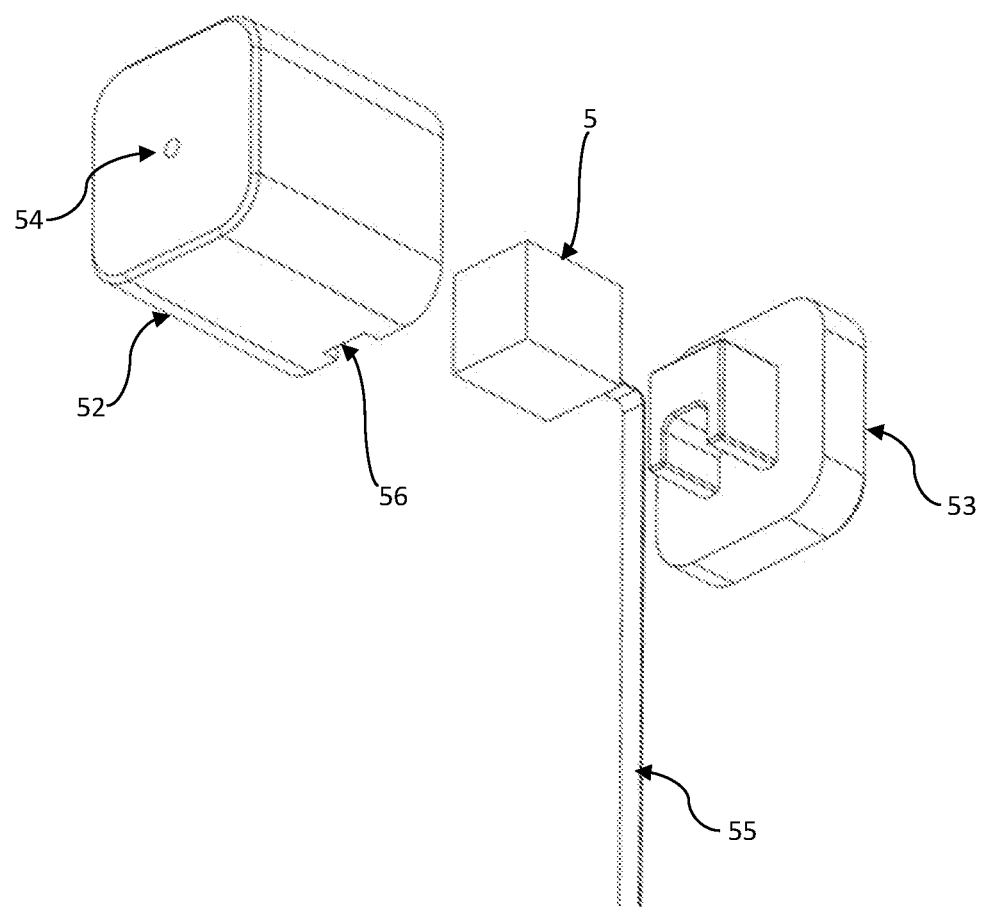
FIG. 5: An exploded view of the radioactivity detector and the detector collimator
Figure 6:
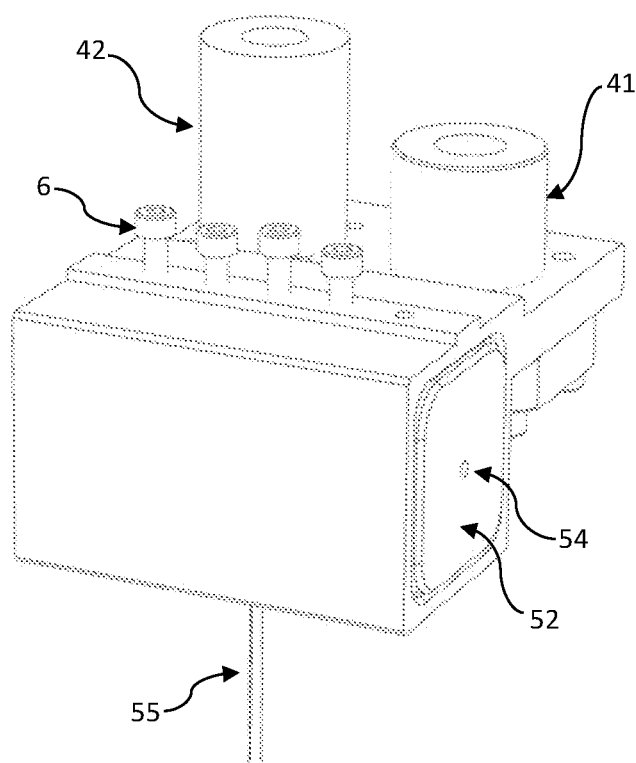
FIG. 6: A view of the radioactivity detector and the detector collimator in a state fixed on the detector carrier
Figure 7:
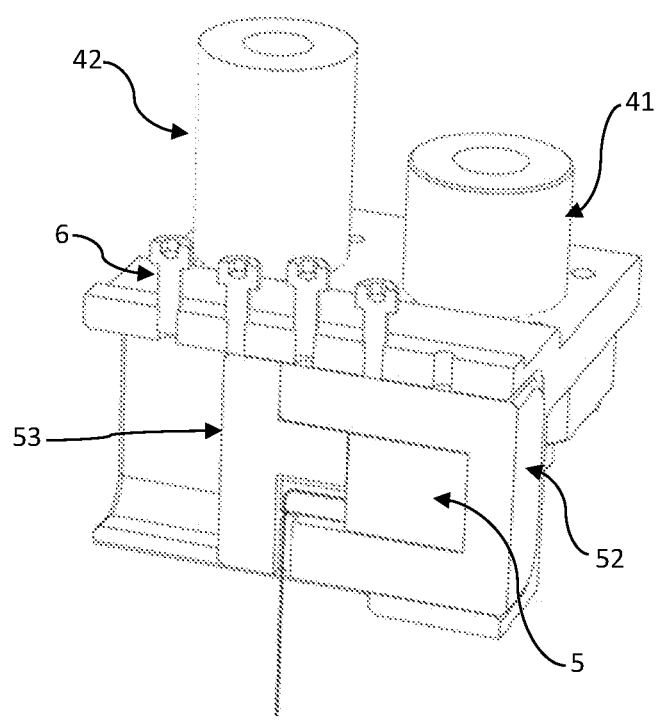
FIG. 7: A sectional view of the radioactivity detector and the detector collimator in a state fixed on the detector carrier
Figure 8:
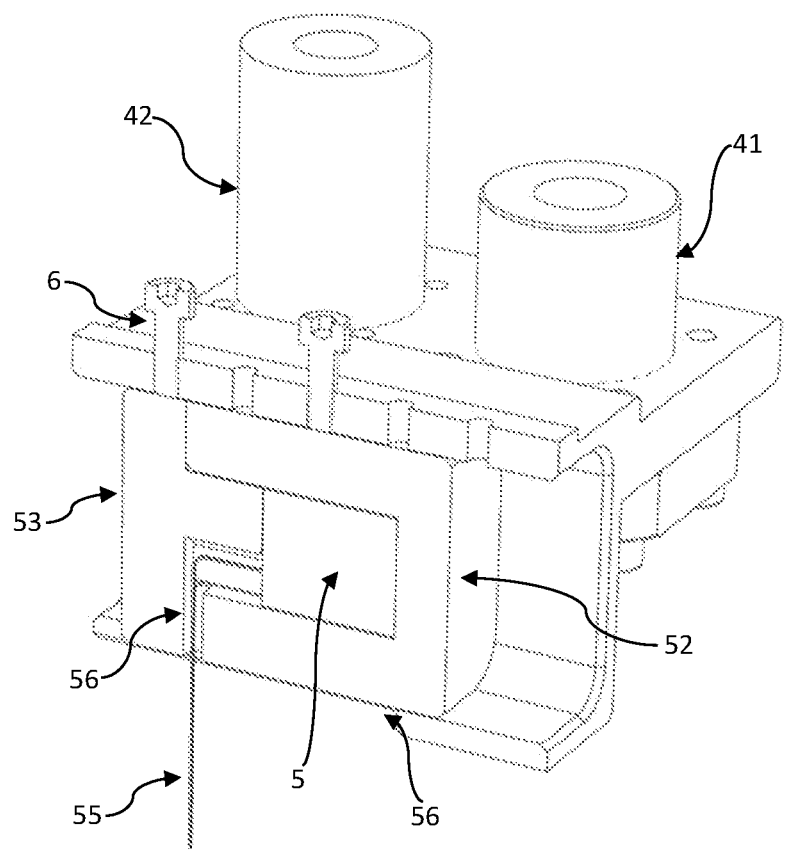
FIG. 8: A sectional view of the radioactivity detector and the detector collimator in a state fixed on the detector carrier via two connection members

| Reference Numerals | |
|---|---|
| 1 | Table |
| 2 | Column |
| 21 | Column body |
| 22 | Column inlet |
| 23 | Column outlet |
| 24 | Plug |
| 25 | Cover |
| 31 | Actuator |
| 32 | Coupling |

-continued

| Reference Numerals | |
|---|---|
| 33 | Rotary shaft |
| 34 | Fixed shaft |
| 35 | First fixing member |
| 351 | Bearing member |
| 36 | Second fixing member |
| 4 | Detector carrier |
| 41 | Rotary shaft bearing |
| 42 | Fixed shaft bearing |
| 5 | Radioactivity detector |
| 51 | Detector collimator |
| 52 | Front collimator |
| 53 | Collimator cover |
| 54 | Collimator aperture |
| 55 | Detector cable |
| 56 | Cable space |
| 6 | Connection member |

DETAILED DESCRIPTION OF THE INVENTION

The invention relates to a system and a method enabling the behavior of a radioactive substance within a structure to be determined. More particularly, the invention relates to a system and a method wherein it is possible to determine, along a column (2), the position and/or distribution and/or movement speed of the substances moving within the column (2) and/or the time when the substances will leave the column (2) and how much of the substance reaching the column outlet (23) will begin to leave the column (2) and with what activity, and consequently, it is possible to provide optimization and automation for proceeding to the next process step.

The system according to the invention comprises in its most basic form at least one column (2) through which the radioactive substance moves, at least one radioactivity detector (5) enabling to detect the radioactive substance within the column (2), and at least one actuator (31) enabling the radioactivity detector (5) to move along the column (2).

In a preferred embodiment of the invention, the actuator (31) is a motor. More specifically, it is a step motor or servo motor.

A preferred embodiment of the invention comprises at least one rotary shaft (33) rotating in a manner dependent on the actuator (31) and the radioactivity detector (5) moves on said rotary shaft (33). The rotary shaft (33) is positioned between at least one first fixing member (35) and at least one second fixing member (36). A preferred embodiment of the invention comprises at least one bearing member (351) allowing the rotary shaft (33) to freely rotate about its own central axis. The bearing member (351) is preferably fixed on the first fixing member (35) and one of the ends of the rotary shaft (33) is supported in this bearing member (351) in such a way that it is able to freely perform the rotational movement. Said bearing member (351) is preferably a bearing. The other end of the rotary shaft (33) is fixed to the actuator (31) that is positioned in the second fixing member (36). A preferred embodiment of the invention comprises at least one coupling (32), which provides the connection between the actuator (31) and the rotary shaft (33) and which enables the rotational movement of the actuator (31) to be transmitted to the rotary shaft (33).

A preferred embodiment of the invention comprises at least one detector carrier (4) on which the radioactivity detector (5) is positioned and together with which said radioactivity detector (5) moves. In this embodiment, the detector carrier (4) has at least one rotary shaft bearing (41) where the rotary shaft (33) is to pass through and to be supported. In a preferred embodiment of the invention, the rotary shaft (33) has a toothed structure. The rotary shaft bearing (41) located on the detector carrier (4) also has a toothed structure. The rotary shaft (33) and the rotary shaft bearing (41) have matching toothed structures to enable the rotary shaft bearing (41) and thus the detector carrier (4) to move on the rotary shaft (33) depending on the rotational movement and direction of rotation of the rotary shaft (33).

A preferred embodiment of the invention comprises at least one fixed shaft (34), which enables the detector carrier (4) to move in a different direction only on a single axis without performing rotational movement. Said fixed shaft (34) is positioned between the first fixing member (35) and the second fixing member (36). In this embodiment of the invention, the detector carrier (4) comprises at least one fixed shaft bearing (42) through which the fixed shaft (34) is to pass and which allows the detector carrier (4) to move on the fixed shaft (34). In this way, the rotary shaft (33) with toothed structure, which rotates depending on the rotational movement of the actuator (31), will rotate inside the rotary shaft bearing (41) with toothed structure, and since the detector carrier (4) is fixed on the fixed shaft (34) by means of the fixed shaft bearing (42), the detector carrier (4) and thus the rotary shaft bearing (41) will not be able to rotate, and due to the toothed structures of the rotary shaft (33) and the rotary shaft bearing (41), the detector carrier (4) will move on the axis of the fixed shaft (34) in different directions depending on the direction of rotation of the rotary shaft (33), in a direction of approaching the first fixing member (35) or the second fixing member (36).

A preferred embodiment of the invention has at least one detector collimator (51) within which the radioactivity detector (5) is positioned. The detector collimator (51) preferably has a two-piece structure. In this embodiment, the detector collimator (51) comprises at least one front collimator (52) and at least one collimator cover (53). The radioactivity detector (5) is positioned into the front collimator (52) and is fixed upon the closing of the collimator cover (53). The front collimator (52) has at least one collimator aperture (54) thereon. The front collimator (52) further has at least one cable space (56) to allow the passage of the radioactivity detector cable (55).

In a preferred embodiment of the invention, the collimator cover (53) is fixed on the front collimator (52) without using any connection member (6). As a result, the front collimator (52) and the collimator cover (53) can be easily separated when it is required to replace the radioactivity detector (5) and/or when it is required to use a front collimator (52) having a collimator aperture (54) of a different size.

The detector collimator (51) is fixed within the housing on the detector carrier (4) and is thus enabled to move together with the detector carrier (4). The distance of the collimator aperture (54) from the column (2) is an important parameter for the radioactivity detector (5) to be able to take reliable radioactivity readings. If the activity of the substances passing through the column (2) is high, the radioactivity detector (5) may become saturated. In order to prevent this from happening, it is necessary to reduce the diameter of the collimator aperture (54) or move the radioactivity detector (5) away from the column (2). For this reason, it is desired that the detector collimator (51) may be fixed at different positions within the housing on the detector carrier (4). For this purpose, at least one, preferably more than one, connection member (6) is utilized for fixing the detector collimator (51) on the detector carrier (4). There is present more than one connection member (6) bearing on the detector carrier (4), and once the detector collimator (51) is brought into the desired position on the detector carrier (4), the fixing action is achieved by means of the connection members (6) positioned into the appropriate connection member (6) bearings. In a preferred embodiment, the front collimator (52) is fixed on the detector carrier (4) by means of at least one connection member (6) and the collimator cover (53) is fixed on the detector carrier (4) by means of at least one connection member (6).

In a preferred embodiment of the invention, the detector carrier (4) has at least one cable space (56) through which the radioactivity detector cable (55) may pass.

The column (2) mentioned within the scope of the invention comprises at least one column body (21), at least one column inlet (22) where the radioactive substance enters the column body (21) and at least one column outlet (23) where the radioactive substance leaves the column body (21). At least one plug (24) is located at the column inlet (22) end and/or column outlet (23) end of the column body (21). Said plugs (24) are fixed with at least one cover (25) so that they can resist the pressure inside the column body (21). Said cover (25) is preferably a toothed cover (25).

A preferred embodiment of the invention comprises at least one table (1) where the column (2) and/or the rotary shaft (33), on which rotary shaft (33) the radioactivity detector (5) moves, and/or the fixed shaft (34) is/are positioned. In said embodiment, the fixed shaft (34) and the rotary shaft (33) are positioned in the second fixing member (36) that is fixed on the table (1). The column (2), the rotary shaft (33) and the fixed shaft (34) are positioned such that the distance of the radioactivity detector (5) from the column (2) will remain constant at all times and said radioactivity detector (5) will be able to scan the column (2) over its entire length.

The method according to the invention comprises the process steps of
charging the radioactive substance with an acid of a certain molarity to the column (2) via the column inlet (22),
collecting the radioactive substance at the top of the column body (21), more specifically at the column inlet (22) end,
guiding the acid, which is used for charging, to the waste effluent via the column outlet (23),
changing the molarity of the acid introduced to the column inlet (22) and thus enabling the charged radioactive substances, which are intended to be separated, to move within the column (2) and
moving the radioactivity detector (5) along the column body (21) after the start of said movement and realizing the scanning process.

The acid passed through the column (2) creates a pressure in the range of 3-11 bars inside the column (2).

The movement of the radioactivity detector (5) along the column body (21) is downward from the top, more specifically, from the column inlet (22) end towards the column outlet (23) end.

The movement in the step of changing the molarity of the acid introduced to the column inlet (22) and thus enabling the charged radioactive substances, which are intended to be separated, to move within the column (2) is from the column inlet (22) end towards the column outlet (23) end.

The speed of the movement of the radioactivity detector (5) along the column body (21) is adjusted depending on the rotational speed of the actuator (31).

In a preferred embodiment of the invention, the scanning takes place continuously; in other words, the radioactivity detector (5) moves continuously. In another preferred embodiment, the radioactivity detector (5) stops and waits after moving for a certain distance and, once the radioactivity value is read at the current position, the radioactivity detector (5) moves again for a certain distance and another reading process is performed.

Figure 9:
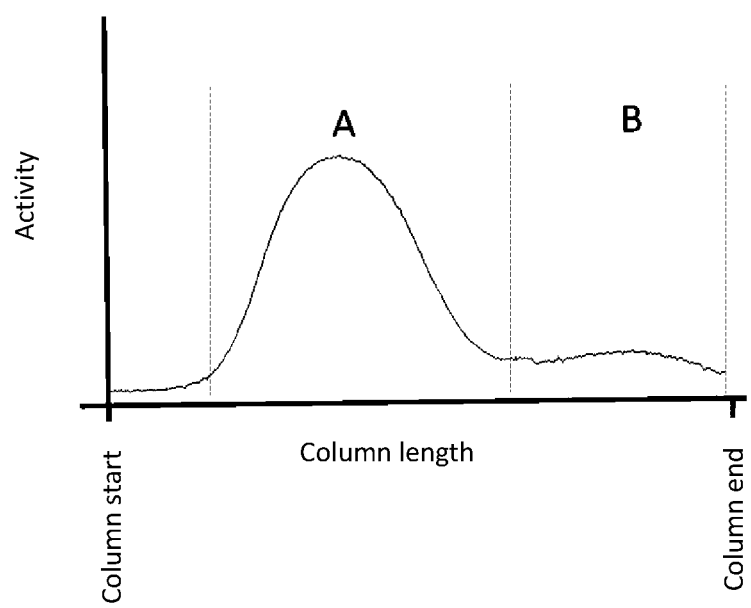
FIG. 9: A graph showing the distribution of the substances being subjected to separation within the column

As a result of the scanning performed, the information about which radioactive substance has dispersed to what extent within the column (2) and the position of the radioactive substances within the column (2) becomes possible to be seen on the activity-distance graph. The zones A and B of the graph shown in FIG. 9 show the distribution of the radioactive substances being separated within the column (9). Since the point of transition from zone A to zone B is previously known, it is possible to proceed to the next process step via automation control once the transition zone reaches the outlet of the column (2).

The invention claimed is:

1. A system enabling the behavior of a radioactive substance within a structure to be determined, wherein the system comprises:
    at least one column through which the radioactive substance moves;
    at least one radioactivity detector enabling detection of the radioactive substance within the column; and
    at least one actuator enabling the radioactivity detector to move along the column.

2. A system according to claim 1, wherein the system comprises at least one rotary shaft, which rotates depending on the rotational movement of the actuator and on which the radioactivity detector moves, at least one first fixing member and at least one second fixing member enabling the rotary shaft to be fixed.

3. A system according to claim 2, wherein the system comprises at least one bearing member enabling the rotary shaft to be supported in such a way that said rotary shaft is able to freely perform the rotational movement about its own central axis.

4. A system according to claim 2, wherein one end of the rotary shaft is connected to the actuator, wherein the system comprises at least one coupling, which enables the connection between the actuator and the rotary shaft to be realized and which enables the rotational movement of the actuator to be transmitted to the rotary shaft.

5. A system according to claim 2, wherein the system comprises at least one table where the column and/or the rotary shaft, on which rotary shaft the radioactivity detector moves, and/or the fixed shaft is/are positioned.

6. A system according to claim 5, wherein the column and/or the rotary shaft, on which rotary shaft the radioactivity detector moves, and/or the fixed shaft is/are positioned on the table such that the distance of the radioactivity detector from the column will remain constant at all times and said radioactivity detector will be able to scan the column over its entire length.

7. A system according to claim 1, wherein the system comprises at least one detector carrier on which the radioactivity detector is positioned and together with which said radioactivity detector moves.

8. A system according to claim 7, wherein the detector carrier has at least one rotary shaft bearing where the rotary shaft is to pass through and to be supported.

9. A system according to claim 8, wherein the rotary shaft and the rotary shaft bearing have matching toothed structures enabling the rotary shaft bearing and thus the detector carrier to move on the rotary shaft depending on the rotational movement and direction of rotation of the rotary shaft.

10. A system according to claim 7, wherein the system comprises at least one fixed shaft, which enables the detector carrier to move in a different direction only on a single axis without performing rotational movement.

11. A system according to claim 1, wherein the system comprises at least one detector collimator within which the radioactivity detector is positioned.

12. A system according to claim 11, wherein detector collimator has a two-piece structure, and the detector collimator comprises at least one front collimator and at least one collimator cover, wherein the front collimator has at least one collimator aperture.

13. A system according to claim 1, wherein the column comprises at least one column body, at least one column inlet where the radioactive substance enters the column body and at least one column outlet where the radioactive substance leaves the column body.

14. A system according to claim 13, wherein column body comprises at least one plug at the column inlet end and/or column outlet end, and wherein the plugs are fixed with at least one cover so that they can resist the pressure inside the column body.

15. A method enabling the behavior of a radioactive substance within a structure to be determined, wherein the method comprises the process steps of:
  charging the radioactive substance with an acid of a certain molarity to a column via a column inlet;
  collecting the radioactive substance at the top of a column body, more specifically at a column inlet end;
  guiding the acid, which is used for charging, to the waste effluent via a column outlet;
  changing the molarity of the acid introduced to the column inlet and thus enabling the charged radioactive substances, which are intended to be separated, to move within the column;
  moving a radioactivity detector along the column body after the start of said movement; and
  realizing the scanning process.

* * * * *